United States Patent
Morrison et al.

[11] Patent Number: 6,045,706
[45] Date of Patent: Apr. 4, 2000

[54] CALCIUM HYPOCHLORITE FEEDER

[75] Inventors: Ralph Morrison, Chebanse; Michael Liebendorfer, Herscher; Richard Dennis, II, Clifton; Joseph Tietjens, Bourbonnais; Roy Martin, Downers Grove, all of Ill.

[73] Assignee: U.S. Filter/Stranco, Bradley, Ill.

[21] Appl. No.: 09/136,858

[22] Filed: Aug. 19, 1998

[51] Int. Cl.⁷ .................................................. C02F 1/76
[52] U.S. Cl. ........................... 210/696; 210/739; 210/169
[58] Field of Search ............................. 210/696, 86, 95, 210/169, 205, 206, 232, 244, 416.2, 198.1, 702, 739, 756

[56] References Cited

U.S. PATENT DOCUMENTS

| | | | |
|---|---|---|---|
| 3,655,054 | 4/1972 | Pansini | 210/169 |
| 3,864,090 | 2/1975 | Richards | 210/169 |
| 4,986,902 | 1/1991 | Serna | 210/205 |
| 5,019,250 | 5/1991 | Lorenzen | 210/169 |
| 5,133,381 | 7/1992 | Wood et al. | 137/268 |
| 5,338,446 | 8/1994 | Schuman et al. | 210/232 |
| 5,567,048 | 10/1996 | Hammonds | 222/105 |

*Primary Examiner*—David A. Simmons
*Assistant Examiner*—Frank M. Lawrence
*Attorney, Agent, or Firm*—McHale & Slavin

[57] ABSTRACT

The instant invention is directed toward an improved calcium hypochlorite feeder for water treatment applications. Tablets of calcium hypochlorite are diluted in an erosion feeder and the high pH effluent is then directed to a precipitation basin where a precipitation enhancing combination of calcium hypochlorite solution and precipitate act to initiate precipitation within the newly formed solution such that calcium carbonate scaling at the injection point and within the associated feed lines and equipment is substantially eliminated.

4 Claims, 2 Drawing Sheets

CALCIUM HYPOCHLORITE FEEDER

FIELD OF THE INVENTION

This invention is related to the treatment of water and in particular, to an apparatus for treating water with calcium hypochlorite.

BACKGROUND OF THE INVENTION

Aquatic facilities are a primary example of the need for proper water conditioning. When water is used for swimming, it must meet stringent health standards. Once the water is preconditioned, it is most economical to recirculate the water through water conditioning equipment to maintain such standards. For this reason, the water is commonly treated with various chemicals. A known problem with water conditioning chemicals is that many of them are dependent on the maintenance of an appropriate pH for proper operation. In many circumstances the chemical itself will cause an alteration of the pH upon its introduction into the water.

Calcium hypochlorite is an oxidizer that is commonly accepted for use in a variety of aqueous systems, including the aquatic environment. However, effective application of calcium hypochlorite is highly dependent on the concentration of alkalinity in the supply water and the treated water pH. Generally speaking, supply water having a high concentration of alkalinity with the addition of calcium hypochlorite causes hard water scaling. This scaling often occurs at the injection point and throughout the feed line. When such scaling occurs, it makes it necessary to routinely remove the scale by disassembly of the equipment and washing in an acid bath.

Calcium hypochlorite is commonly manufactured in the form of pellets and inserted into a water-treatment application by dissolving the pellets before injection. The calcium hypochlorite pellet, in its commercially available form, generally consists of the following constituents.

Calcium hypochlorite 69–71%

Water 5.5–8.5%

Sodium Chloride 14–17%

Calcium Hydroxide 2–2.5%

Calcium Carbonate 2–2.5%

Other Soluble Calcium Salts 1–2.5%

Two types of chemical feeders are commonly used for dissolving calcium hypochlorite pellets. An erosion feeder immerses calcium hypochlorite pellet s into a solution of water thereby allowing the water to dissolve the pellets, the water is then transferred into the water treatment application. Alternatively a feeder may consist of an apparatus wherein water is sprayed onto the pellets, either from above or below. The water feed contains some alkalinity and typically has a pH of around 7.5. The alkalinity will precipitate out at a pH of around 8.3. The problem with calcium hypochlorite is that it includes hydrated or slaked lime—calcium hydroxide $(Ca(OH)_2)$ which can elevate the pH of water. Typically the water discharged from the feeder has a pH of about 10.5. due to the dissolution of calcium hydroxide. In the presence of calcium and alkalinity, an elevation of the pH leads to calcium carbonate scaling which results in clogging of the feeders.

A small amount of scale can quickly restrict or stop the output of a chemical feeder. In a swimming pool or spa, the fluctuation of pH and its effect on chlorine feed can quickly lead to expensive maintenance problems and/or unsanitary conditions. More importantly, such problems can result in a safety concern to those servicing, as well as using, the facilities. The actual rate at which the restriction develops is largely dependent upon the concentration of alkalinity in the water. Generally, the higher the alkalinity, the faster the restriction develops. Because of the formation of this undesired calcium carbonate scale, maintenance of chemical feed systems in such a water treatment application can be high and is often considered unacceptable. Frequent cleaning of feeders and downstream equipment may be necessary to remove the scale. For this reason, it is typically recommended by suppliers of calcium hypochlorite to use HCl for controlling pH of pool water, because it destroys alkalinity. This often creates additional problems because HCl is a strong acid and dangerous fluctuations in pH can occur very quickly, especially if water flow is restricted at some point.

Thus, what is lacking for water treatment applications is a safe and convenient means for eliminating or reducing calcium carbonate scaling in the feed lines and injection points of calcium hypochlorite based water treatment systems.

SUMMARY OF THE INVENTION

The instant invention is an improved calcium hypochlorite feeder for use in water treatment systems wherein a settling chamber or precipitation basin is employed downstream of the calcium hypochlorite pellet erosion chamber. As the supply water dissolves the calcium hypochlorite pellets, the alkalinity thereof increases due to the concomitant dissolution of calcium hydroxides. The settling basin then fills with this high pH solution and precipitation occurs. The precipitate formed in this basin remains fluid and does not form scale when fed to the injection point and allowed to flow through the associated feed lines. Moreover, what has surprisingly been discovered, is that as additional calcium hypochlorite is dissolved, any alkalinity present in the newer solution will readily precipitate upon contact with the precipitate containing solution resident in the high pH settling chamber. While not wishing to be bound to any particular theory of operation, it is believed that the existing precipitate in the chamber serves as nucleation sites to enhance the precipitation process. The fluid containing the precipitate can then be fed without problem, since no precipitate forming reaction occurs in the lines or at the injection point.

Thus, an objective of the instant invention is to teach an apparatus capable of retarding the formation of scale in water conditioning systems by substantially reducing or even eliminating calcium carbonate scale when calcium hypochlorite feeders are employed.

Another objective of the instant invention is to teach an apparatus that reduces or eliminates scaling of injection feeders to provide a continuous and predictable feeder output.

Yet another objective of the instant invention is to teach the inclusion of a settling chamber or precipitation basin downstream of the erosion chamber to reduce or eliminate scaling at the injection point and throughout the feed lines of water treatment apparatus.

Still another objective of the instant invention is to teach a precipitation chamber that is sized to maintain a solution velocity greater than a settling velocity, to prevent accumulation of precipitation in the chamber.

Other objectives and advantages of this invention will become apparent from the following description taken in conjunction with the accompanying drawings wherein are set forth, by way of illustration and example, certain embodiments of this invention. The drawings constitute a

DETAILED DESCRIPTION OF THE PREFERRED EMBODIMENT

Figure 1:
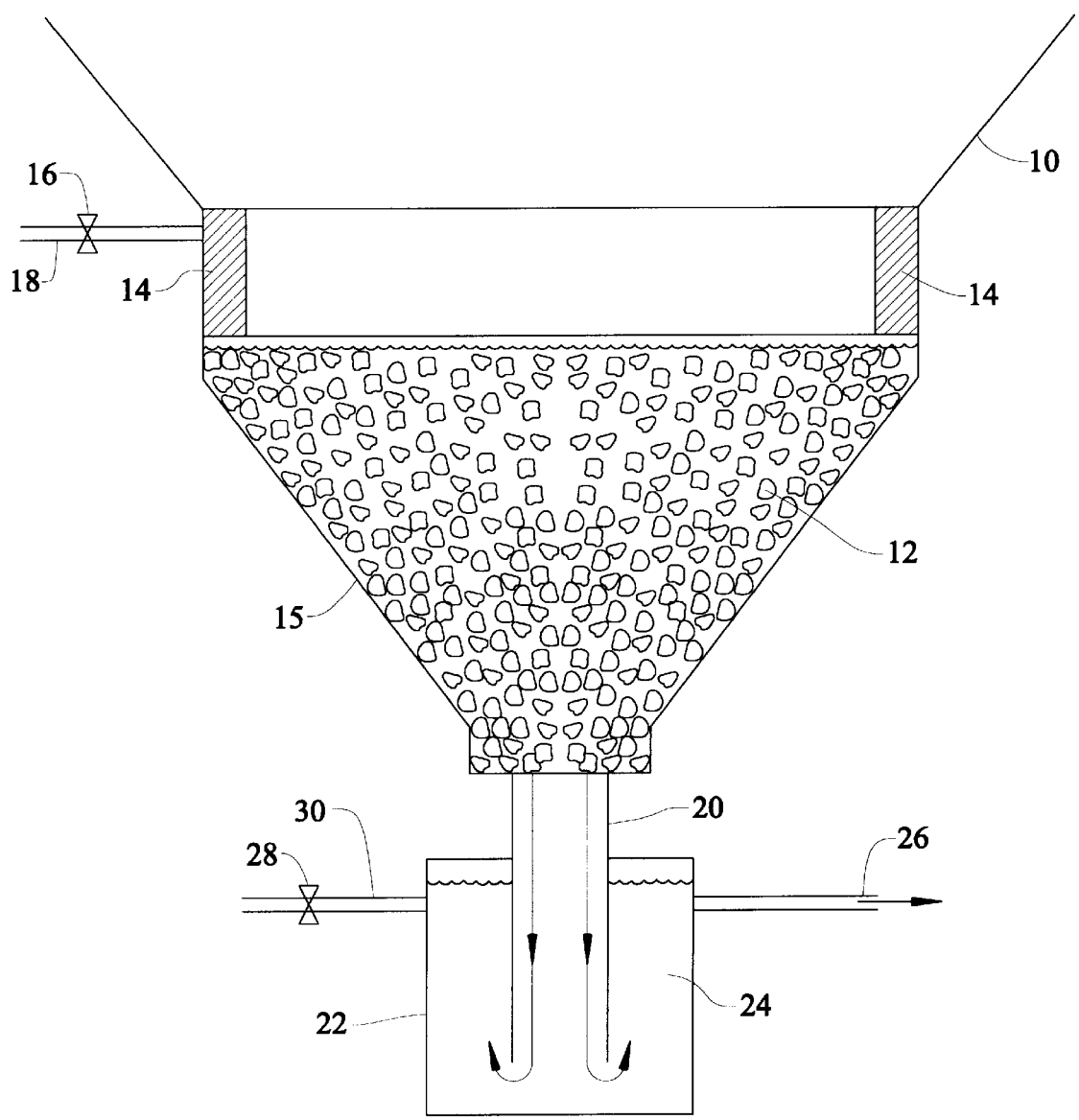
FIG. 1 is a cross-sectional diagram of the calcium hypochlorite feeder of the instant invention.

Now referring to FIG. 1, the cross-sectional diagram illustrates the calcium hypochlorite feeder of the instant invention. Dry chemical storage hopper 10 is filled with pellets of calcium hypochlorite 12. The pellets flow downward via gravity through a water conduit 14, which consists of one or more water distribution nozzles, and into the erosion chamber 15. When chlorine feed is required by the application, the chlorine feed control 16, which in a preferred embodiment is a solenoid controlled valve, opens to allow a supply of water to flow through the inlet feed water conduit 18 and subsequently dispersed through the water conduit 14. The water conduit allows water to exit only at its perimeter, thereby causing water to flow down the walls of the erosion chamber, which is positioned downstream therefrom. The inlet feed water may consist of a fresh water source such as a municipal water supply or alternatively the inlet feed water may be filtered water taken from a main body of water such as a spa or swimming pool. This water contains some alkalinity and typically has a pH of about 7.5. Water being emitted from the water distribution conduit 14 then flows through the dry calcium hypochlorite pellets in the erosion chamber and forms a solution of calcium hypochlorite. Dissolution of the calcium hypochlorite pellets creates a high pH solution, e.g. a solution having a pH at least greater than 8.3 and typically on the order of about 10.5. This solution flows through solution guide pipe 20 where it emerges near the lower portion of precipitation basin 22 and forms a precipitate in the basin. This precipitate remains fluid, and does not form scale when fed through the injection device 26, which in a particular embodiment may be a venturi. As additional calcium hypochlorite is dissolved, the new solution must pass through the basin which has a high pH solution and precipitate resident therein from the previous feed. Any alkalinity present in the newer solution will readily precipitate in the high pH basin. It appears that the existing precipitated particles in the basin function as nucleation sites to enhance the precipitation of the newer solution. The solution can then be fed without any scaling problem occurring in the associated feed lines and at the delivery point.

The solution in the precipitation basin is typically evacuated by creating a reduced pressure, such as with the use of a venturi, and is injected into the process. When it is desired to flush the precipitation basin, the solenoid operated valve 28 is opened allowing flushing water to enter via inlet flush water supply conduit 30 and exit through the injection device. It is noted that valve 28 may also be activated manually.

Figure 2:
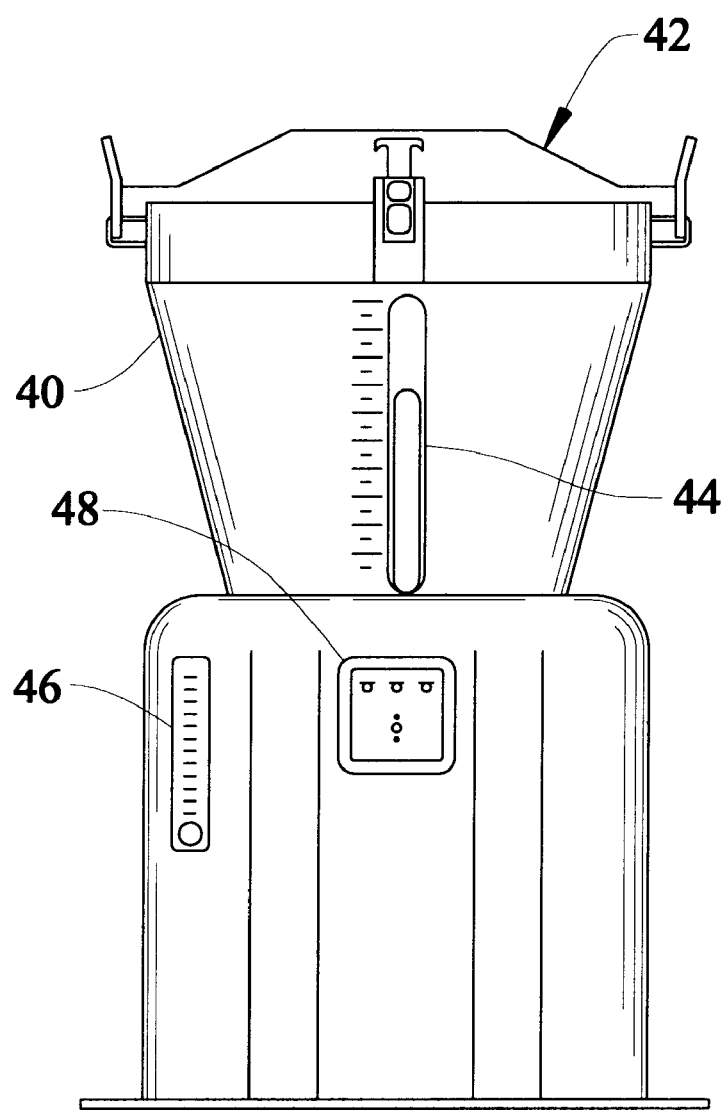
FIG. 2 is a pictorial view of a particular feeder embodiment.

Now referring to FIG. 2, in a particular embodiment, the dry chemical storage hopper 40 is provided with a latching cover 42. The latching cover may be removable from the hopper and is constructed and arranged so as to sealingly engage said hopper, thereby preventing the entrance of unwanted materials. A level indicator 44 provides the operator with an accurate assessment of the amount of chemical remaining in the hopper. Flowmeter 46, which can be a rotameter, provides both a positive indication that flow is occurring and an instantaneous indication of the particular flow rate. Automatic controller 48 is electrically coupled with remotely controlled solenoid valves 16 and 28 (FIG. 1) which are selectively operable on demand, so as to automatically provide chlorination and/or flushing of the precipitation basin in accordance with particular operating parameters. In a particular embodiment, the automatic controller is provided with data regarding the feed rate of calcium hypochlorite from the hopper and the volume of the chemical storage hopper being utilized. Utilizing this data, the automatic controller can readily determine the point at which the chemical hopper will be depleted by calculating the total time of feed, e.g. by using the total time that the chlorine feed control valve has been opened, and factoring in the known feed rate. The controller can then be adapted to notify the end-user, by a variety of means such as a buzzer or alternate sounding device, printing of a work order, or transmission of a signal to a remote location, that depletion of the contents of the chemical hopper is imminent and additional chemical must be supplied.

It will be obvious to one of ordinary skill in the art that various changes may be made to the claimed device, allowing use in various water treatment applications, without altering the scope of the invention. The scope of the invention is defined by the claims appended hereto.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawing and described in the specification.

What is claimed is:

1. A process for feeding calcium hypochlorite pellets to a water conditioning system comprising:

providing a dry chemical storage hopper for holding calcium hypochlorite pellets;

flowing said calcium hypochlorite pellets downwardly through said hopper;

providing a water distribution conduit disposed within said dry chemical storage hopper and constructed and arranged so as to emit water from the perimeter thereof;

providing an inlet water feed conduit in fluid communication with said water distribution conduit and providing a supply of water thereto;

providing an erosion chamber positioned downstream from said water distribution conduit and in fluid communication therewith, causing water emitted from said conduit to flow over said calcium hypochlorite pellets, forming a calcium hypochlorite solution having a pH in the range of about 8.3–10.5;

providing a chlorine feed control valve in fluid communication with said conduit and constructed and arranged such that calcium hypochlorite solution will be formed when demanded by the system;

transporting said calcium hypochlorite solution through a solution guide pipe and into a precipitation basin;

allowing a precipitate to form and retaining said calcium hypochlorite solution and said precipitate in said precipitation basin; and injecting the calcium hypochlorite solution and precipitate into said water conditioning system;

whereby the calcium hypochlorite solution, in combination with the precipitate formed and retained in said precipitation basin, provide enhanced precipitation of newly formed calcium hypochlorite solution therein, thus retarding the formation of calcium carbonate scale deposits within said system.

2. The process according to claim 1, further comprising:

providing a flushing water feed control valve, said valve being operable upon demand by the system and being in fluid communication with an inlet flushing water supply conduit, said inlet flushing water supply conduit being in further fluid communication with said precipitation basin.

3. The process according to claim 2, further comprising:

providing a manual or automatic controller coupled with the chlorine feed control valve and flushing water feed control valve so as to selectively cause opening or closing of said feed control valves in response to a demand from said system.

4. The process according to claim 3, further comprising:

providing a means for notifying an end-user to add calcium hypochlorite to said hopper prior to depletion of said calcium hypochlorite therefrom.

\* \* \* \* \*